United States Patent [19]

Buck

[11] 4,166,137

[45] Aug. 28, 1979

[54] METHOD OF DETERMINING THE OPTIMUM TIME TO TURN MEATS IN A MICROWAVE OVEN

[75] Inventor: Ronald G. Buck, Burnsville, Minn.

[73] Assignee: Litton Systems, Inc., Beverly Hills, Calif.

[21] Appl. No.: 829,077

[22] Filed: Aug. 30, 1977

[51] Int. Cl.² .......................... A23L 1/00; H05B 9/06
[52] U.S. Cl. .................................... 426/243; 426/523; 219/10.55 M
[58] Field of Search ............... 426/233, 241, 243, 523; 219/10.55 R, 10.55 M, 10.55 B

[56] References Cited

U.S. PATENT DOCUMENTS

| | | | |
|---|---|---|---|
| 3,467,804 | 9/1969 | Smith | 219/10.55 R |
| 3,839,616 | 10/1974 | Risman | 219/10.55 R |
| 4,080,564 | 3/1978 | Nitta et al. | 219/10.55 B |

OTHER PUBLICATIONS

Schmidt, A. X. et al., "Material and Energy Balances", Prentice-Hall Inc., N.J., 1962, pp. 61-65.

Primary Examiner—Robert A. Yoncoskie
Attorney, Agent, or Firm—Robert E. Lowe

[57] ABSTRACT

A method for indicating the optimum time at which to turn meat over in a microwave oven. The method detects the point where the absolute humidity remains constant and no longer increases indicating that the temperature of the meat has reached an equilibrium point. At the temperature equilibrium point, the meat is ready to be turned over.

4 Claims, 2 Drawing Figures

METHOD OF DETERMINING THE OPTIMUM TIME TO TURN MEATS IN A MICROWAVE OVEN

BACKGROUND OF THE INVENTION

1. Field of the Invention

The present invention relates generally to improvements in a method of cooking in a microwave oven, and more particularly, pertains to a new and improved method for determining the optimum time to turn meats in a microwave oven.

2. Description of the Prior Art

In the field of microwave ovens, it has been a general practice to employ probes stuck into a food such as meat indicating the temperature of the meat at that particular location at which the probe is stuck. Such thermometer types of probes have been unsatisfactory in that the probe only indicates the temperature at that one particular location for the piece of meat and is not an indication of the true overall temperature of the piece of meat or more importantly, the doneness of that piece of meat. Also, the accuracy of the probes is sometimes less than desirable as not being a true indication of the surface temperature of the meat or the internal temperature of the meat, especially when the meat has reached an equilibrium temperature. In not indicating the surface temperature of the meat, a cook is not able to tell when to turn the meat over and by not indicating the overall equilibrium of internal temperature of the meat, the cook is not able to determine when the meat is cooked to doneness.

This invention, a method for determining the optimum time for turning meats in a microwave oven, overcomes the disadvantages of the prior art devices by providing an accurate method for determining when the meat is to be turned over, in addition to taking into account the continuity through an increment for the time that the cook opens the door of the microwave oven, turns the meat over, and closes the door to resume microwave heating.

SUMMARY OF THE INVENTION

The present invention obviates the foregoing disadvantages of the prior art by providing a method for determining the optimum time when meat is to be turned over in a microwave oven.

According to the preferred embodiment of the present invention, there is provided a method for determining the optimum time when the meat is to be turned over in a microwave oven having the steps of checking to see whether the humidity is increasing or whether the humidity is remaining constant in the microwave oven heating cavity; upon sensing a constant absolute humidity condition, indicate to the cook to turn the meat over; storing the time difference that the door is open and closed, and lowering the duty cycle on again resuming microwave cooking.

A significant aspect and feature of the present invention is a step which handles the time discontinuity where the cook is turning the meat over when the microwave oven door is open. This method takes the time discontinuity into account and increments the temperature by a small factor of x degrees centigrade per second for the time period that the door is open and microwave cooking of the food is not taking place.

Having briefly described the preferred embodiment of the present invention, it is a principal object to provide a new and improved method for determining the optimum time to turn meats over in a microwave oven.

An object of the present invention is to determine when the absolute humidity no longer increases but remains constant indicating that it is time for a cook to turn meat over. A "Turn Food Over" control will indicate to a cook through an illuminated panel light and an audible alarm on the microwave oven to turn the meat over before microwave heating can then continue.

Another object of the invention is to provide a step to store the time that the microwave oven door is opened during the time that the cook is turning over the meat. When the door is closed, microwave heating continues but the duty cycle is adjusted accordingly to account for the time that the door was opened while the cook was turning over the food.

A further object of the invention is to indicate to the cook to close the door of the microwave oven after a predetermined time has been exceeded.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like elements throughout the figures thereof and wherein.

DESCRIPTION OF THE PREFERRED EMBODIMENT

Figure 1:
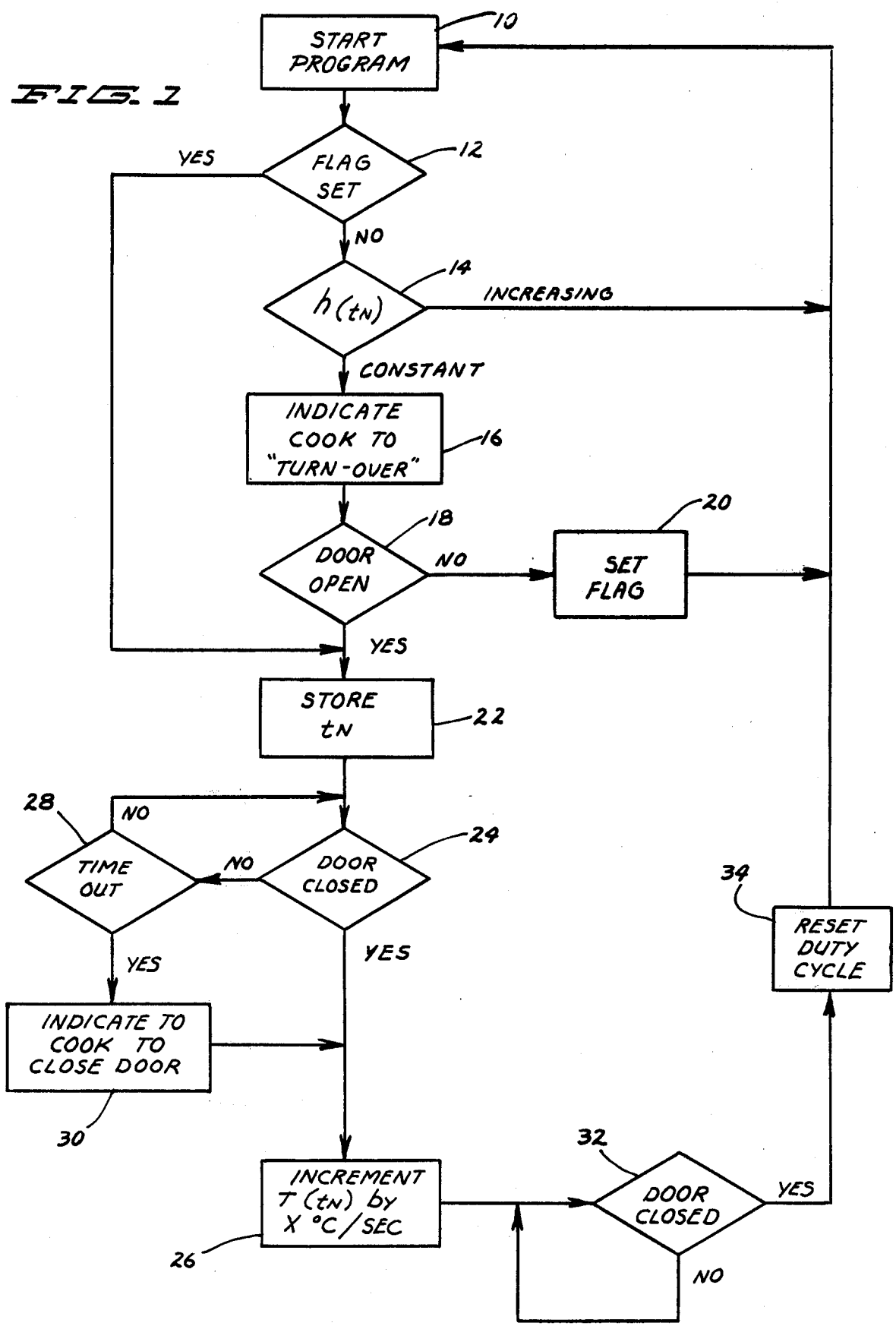
FIG. 1 illustrates a flow chart for performing the steps of the method of optimum time to turn meats in a microwave oven in accordance with the present invention.

FIG. 1 illustrates a flow chart of the steps for the method of determining the optimum time to turn meats in a microwave oven in accordance with the present invention showing a start program condition 10. When a NO flag set condition 12 exists, the program proceeds to determine whether absolute humidity is either constant or increasing with respect to the previous sensed and sampled absolute humidity. If an absolute humidity condition 14 is increasing, the program recycles itself returning to start program 10 and again determine absolute humidity. If the humidity condition 14 is constant, an indication condition 16 is given to the cook to turn the meat over such as through a front panel light on the control panel of the microwave oven in addition to an audible alarm as required. If the NO door open condition 18 exists where the microwave oven is not detected as being opened, a set flag condition 20 occurs and the program again recycles itself returning to start program 10. When a YES flag set 12 condition exists and the program returns to start program 10, the sensing and sampling of the humidity 14, the indication to the cook to turn the meat over 16, and the door open 18 is skipped by the YES flag set 12 condition. When the YES door open 18 condition occurs, a store $t_n$ 22 of the door open time occurs. When a YES door closed 24 condition occurs, an increment of $T(t_n)$ by x degrees centigrade per seconds 26 for the time that the door is left opened is taken into account. When the YES door closed 32 condition exists, the reset duty cycle 34 of the microwave power supply occurs for a predetermined cooking algorithm and the program again restarts at start program 10. The algorithm then senses when the food is cooked to internal doneness. If the door is not closed within a predetermined time interval and a YES time out 28 condition exists, then there is an indication to the cook to close door 30 condition. Again, there is an increment of $T(t_n)$ by x degrees centigrade per second for the time that the door remains open. If the NO door closed 24 condition and the NO time out 28 condition occurs, the program continues to the increment $T(t_n)$ 26 condition when the door is closed before the YES time out 28 condition occurs, otherwise the program proceeds to indicate to the cook to close door condition 30.

PREFERRED MODE OF OPERATION

In theory, there are two primary reasons for turning meats over. First, the meat heats quicker on the bottom than on the top as conductive heat losses on the bottom are much less than convective heat loss on the top of the meat. Second, the other is to reverse gravitational flow of natural meat juices, minimize weight loss, and optimize palatability as well as juices of the meat. Also, when the top of the meat reaches an equilibrium temperature of one hundred degrees centigrade, that is, where the "characteristic humidity curve" plateaus, the bottom of the meat tends to overheat.

Figure 2:
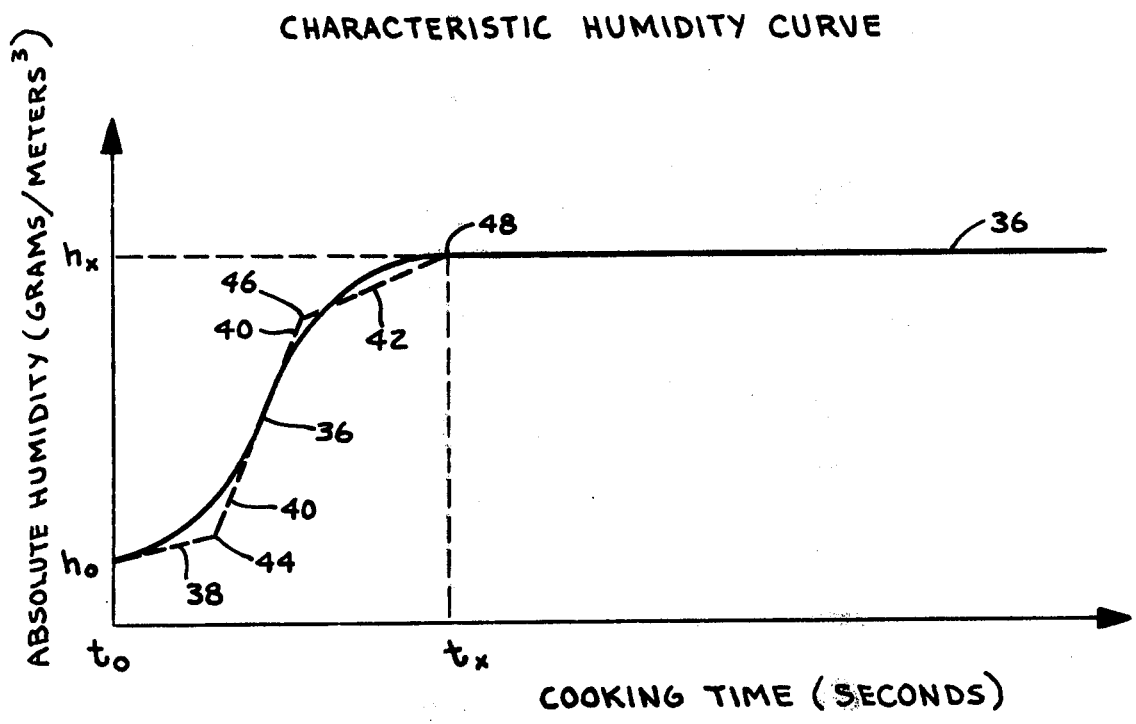
FIG. 2 illustrates a typical "characteristic humidity curve" for the present invention.

The "characteristic humidity curve" 36 of absolute humidity in grams per cubic meter versus cooking time in seconds of FIG. 2 is determined by sensing the time dependent "in-situ" humidity and temperature environmental conditions of the microwave oven heating cavity during microwave cooking for a particular type of food. The time dependent "in-situ" environmental conditions are defined as the sensed humidity and temperature conditions of the microwave oven heating cavity by humidity and temperature sensors. The term "in-situ" as used in this application is defined as the actual time dependent environmental conditions which exist in the environment surrounding the food product such as thin meat which is located in and cooked in the microwave oven heating cavity. Although in the present invention, a humidity sensor and a temperature sensor may be positioned outside of the microwave oven heating cavity, the sensors are configured to sense the "in-situ" environmental conditions of the microwave oven heating cavity and provide "in-situ" signal information of the environmental conditions of the microwave oven heating cavity to a programmable controller controlling the microwave oven. Each particular food has its own particular "characteristic humidity curve". $h_o$ is the initial absolute humidity and hx is the peak absolute humidity at time, tx for the "characteristic humidity curve" 36 of FIG. 2.

The "characteristic humidity curve" 36 of FIG. 2 can be approximated as a three segment 38, 40, and 42 piecewise linear curve prior to time tx. The slope of the first segment 38 of the three segment piecewise linear curve is proportional to the rise in surface temperature of the food up to one hundred degrees centigrade. Once the hottest section of the surface has reached one hundred degrees centigrade which occurs at the change of slope 44, the humidity increases rapidly as illustrated by the slope of the second segment 40 of the three segment piecewise linear curve which is due to the "latent heat of vaporization" of the food. The change of slope 46 is indicative of the beginning of the surface temperature of the food reaching equilibrium. The slope of the third segment 42 of the three segment piecewise linear curve from points 46 to 48 is equilibrium of the surface temperature of the food occuring. The "characteristic humidity curve" peaks out at 48 and plateaus indicating the surface of the food has reached one hundred degrees centigrade. Point 48 on the "characteristic humidity curve" of FIG. 2, also indicate cook to "turn over" 16 condition on the flow chart of FIG. 1, is the optimum time to turn the meat or food over as complete temperature equilibrium is reached.

The method of optimum time to turn meats in a microwave oven can be implemented as an algorithm in accordance with the flow chart of FIG. 1 with the algorithm of the flow chart stored in a programmable controller such as an Intel 8080 microprocessor.

An aluminum oxide humidity sensor, such as a Thunder Scientific TC-2000 Humidity Measurement Module, and a temperature sensor, such as a National Semiconductor Corporation LX 5700 Temperature Transducer, are positioned adjacent to and by the exterior of the exit ventilation port for way of example and purposes of illustration only of the microwave heating oven cavity to sense the time dependent "in-situ" humidity and temperature environmental conditions in the microwave oven heating cavity and connect to the programmable controller. The sensors are positioned to sense the time dependent "in-situ" environmental conditions of the microwave oven heating cavity and are electromagnetically isolated from the microwave oven heating cavity. The programmable controller contains an algorithm to convert the sensed and sampled relative humidity as required for the humidity $h(t_n)$ 14 condition in the flow chart of FIG. 1. Further, the programmable controller connects to the microwave power source power supply, the air exchange control and the indication controls on the front panel of the microwave oven to indicate "Turn Food Over" 16 and "Time Out" 28 conditions.

The algorithm of FIG. 1 stored in the memory of the programmable controller indicates whether the absolute humidity is increasing or constant 14. If a constant absolute humidity 14 condition exists, the programmable controller indicates to the cook through a "Turn Food Over" control in the microwave oven to turn the food such as meat where the one hundred centigrade equilibrium point 48 of FIG. 2 is reached. The programmable controller upon detecting the YES door open 18 condition stores the time $t_n$ 22 that the oven door is opened and if a NO door open 18 condition exists, a set flag 20 condition occurs.

The programmable controller through the algorithm monitors to determine how long it takes the cook to close the door 24. If the door close 24 is not completed within a predetermined set time, the time out 28 condition occurs giving an indication to the cook to close the door 30. When the door closed 32 condition occurs, the temperature of the food is incremented 26 by x degrees centigrade per second for the time that the door remained open. In practice, the incrementation factor is approximately equal to the rate of heating prior to the opening of the door and this factor is computed by an algorithm for the computation of meat temperature. When the door closed 32 condition occurs, the duty cycle reset 34 is performed by the programmable controller to a lower duty cycle taking into account the temperature increment adjustment performed at block 26.

When food is cooking and the temperature is rising at a certain rate, the temperature will continue to rise for a certain period of time after heating ceases because the heat is pushed into the center of the food by the surface temperature of the food. For this reason, it is necessary to take into account and increment the temperature of the food. The incrementation takes into account the situation when the meat is being turned to account for this heating discontinuity through an increment of temperature by x degrees per centigrade of seconds that the door is open. It has been found that five degrees centigrade per mintue is a general practical incrementation factor, but any other suitable incrementation may be substituted which of course depends upon the type and weight of meat being cooked in the microwave oven. Once the meat is turned over, and the flow chart of the figure repeats to indicate when the absolute humidity 14 is again constant, indicating that the food is done as the other side of the meat has reached equilibrium temperature and a food done indication is given to the cook.

Various modifications are contemplated and may obviously be resorted to by those skilled in the art without departing from the apparent scope of the invention as hereinafter defined by the appended claims as only a preferred embodiment thereof has been disclosed. While the method is drawn to the optimum time to turn meat over, this algorithm applies to any food such as poultry, fish, etc. It may also be desired that if the microwave oven door is open for a short time period while turning over the meat, it may be desired not to reset the duty cycle 34 of the microwave power source.

Having thus described the invention, there is claimed as new and desired to be secured by Letters Patent:

1. A method for cooking a foodstuff of the type requiring turning during cooking in a microwave oven having a cooking cavity, a source of microwave energy, a controller including a programmable microprocessor, and means for sensing the time-dependent humidity in said cooking cavity, said method comprising the steps of:
   (a) placing said foodstuff on a first side thereof into said cooking cavity;
   (b) applying microwave energy from said source to said cooking cavity to heat said foodstuff;
   (c) sensing the time-dependent humidity of said cooking cavity with said sensing means while applying microwave energy to heat said foodstuff and providing said sensed humidity as an input to said programmable microprocessor;
   (d) determining in said microprocessor during the heating step when said time-dependent sensed humidity becomes substantially constant; and
   (e) providing an oven operator signal to turn said foodstuff to a second side thereof when said substantially constant humidity condition is reached.

2. The method of claim 1 wherein said time-dependent humidity is absolute humidity.

3. The method of claim 1 further comprising the steps of:
   (a) measuring the time period during which the microwave oven door is open and said source of microwave energy is non-operative while said foodstuff is being turned to said second side; and
   (b) adjusting the food cooking time when said time period exceeds a predetermined time.

4. The method of claim 3 wherein said food cooking time adjusting step is carried out by a program stored in said microprocessor.

* * * * *